United States Patent
Tae et al.

(10) Patent No.: US 9,753,336 B2
(45) Date of Patent: Sep. 5, 2017

(54) LIQUID CRYSTAL DISPLAY

(71) Applicant: Samsung Display Co., Ltd., Yongin, Gyeonggi-Do (KR)

(72) Inventors: Chang Il Tae, Seoul (KR); Swae-Hyun Kim, Asan-si (KR); Eun-Kil Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 150 days.

(21) Appl. No.: 14/531,038

(22) Filed: Nov. 3, 2014

(65) Prior Publication Data

US 2015/0378221 A1    Dec. 31, 2015

(30) Foreign Application Priority Data

Jun. 25, 2014    (KR) ........................ 10-2014-0078100

(51) Int. Cl.
*G02F 1/1362*    (2006.01)
*G02F 1/1343*    (2006.01)

(52) U.S. Cl.
CPC .. *G02F 1/134309* (2013.01); *G02F 1/134363* (2013.01); *G02F 2001/134345* (2013.01); *G02F 2001/136218* (2013.01)

(58) Field of Classification Search
CPC ............... G02F 1/13439; G02F 1/1362; G02F 1/136209; G02F 1/136227; G02F 1/1365; G02F 1/1368; G02F 2001/136218; G02F 2001/136222; G02F 2001/136231; G02F 2001/13625; G02F 2001/1635; G02F 2201/122; G02F 1/1333; G02F 1/133305; G02F 1/13338; G02F 1/1334; G02F 1/133504; G02F 1/133528; G02F 1/133553; G02F 1/13392; G02F 1/1345; G02F 1/13471

See application file for complete search history.

(56) References Cited

U.S. PATENT DOCUMENTS

| | | | |
|---|---|---|---|
| 7,583,346 B2 | 9/2009 | Hsieh et al. | |
| 7,982,829 B2 * | 7/2011 | Hanaoka | C09K 19/38 349/100 |
| 8,319,926 B2 | 11/2012 | Shoraku et al. | |
| 2011/0157537 A1 * | 6/2011 | Chen | G02F 1/133707 349/158 |
| 2011/0170027 A1 * | 7/2011 | Nakanishi | G02F 1/133707 349/33 |

(Continued)

FOREIGN PATENT DOCUMENTS

| | | |
|---|---|---|
| EP | 2105785 A1 | 9/2009 |
| JP | 3600196 B2 | 9/2004 |

(Continued)

*Primary Examiner* — Dung Nguyen
*Assistant Examiner* — Shan Liu
(74) *Attorney, Agent, or Firm* — Cantor Colburn LLP

(57) ABSTRACT

A liquid crystal display includes a first field generating electrode and an opposed electrode facing each other with a liquid crystal layer interposed therebetween, a shielding electrode line separated from the first field generating electrode, and a second field generating electrode including a plurality of branch electrodes overlapping the first field generating electrode, where the first field generating electrode includes at least one step portion adjacent to and facing the shielding electrode line.

18 Claims, 12 Drawing Sheets

(56) References Cited

U.S. PATENT DOCUMENTS

| | | | | |
|---|---|---|---|---|
| 2012/0075542 A1* | 3/2012 | Kim | .................. | G02F 1/1393 349/33 |
| 2012/0162559 A1* | 6/2012 | Kim | .................. | G02F 1/134363 349/42 |
| 2012/0162591 A1* | 6/2012 | Chu | .................. | G02F 1/134309 349/139 |
| 2013/0002625 A1* | 1/2013 | Liao | .................. | G02F 1/134309 345/205 |
| 2013/0057813 A1* | 3/2013 | Jeong | .................. | G02F 1/134309 349/110 |
| 2015/0070644 A1* | 3/2015 | Lee | .................. | G02F 1/134309 349/142 |

FOREIGN PATENT DOCUMENTS

| | | |
|---|---|---|
| JP | 4013941 B2 | 9/2007 |
| JP | 2010169814 A | 8/2010 |
| JP | 4950219 B2 | 6/2012 |
| KR | 1020130101329 A | 9/2013 |

* cited by examiner

LIQUID CRYSTAL DISPLAY

This application claims priority to Korean Patent Application No. 10-2014-0078100 filed on Jun. 25, 2014, and all the benefits accruing therefrom under 35 U.S.C. §119, the entire contents of which are incorporated herein by reference.

BACKGROUND (a) Field

The invention relates to a liquid crystal display ("LCD"). More particularly, the invention relates to an LCD in which a control force of a liquid crystal is increased to reduce a texture.

(b) Description of the Related Art

A liquid crystal display ("LCD") is one of flat panel displays that are widely used. The LCD includes two display panel sheets in which field generating electrodes such as pixel electrodes and a common electrode are formed, and a liquid crystal layer interposed between the display panel sheets. In the LCD, a voltage is applied to the field generating electrodes to generate an electric field in the liquid crystal layer, which determines the direction of liquid crystal molecules of the liquid crystal layer, and an image is displayed by controlling the polarization of incident light.

Among the LCDs, a vertically aligned mode LCD, in which liquid crystal molecules are aligned so that long axes thereof are perpendicular to the upper and lower panels while the electric field is not applied, has been in the limelight because its contrast ratio is substantially large and a wide reference viewing angle is easily implemented.

In order to implement a wide viewing angle in such a vertically aligned mode LCD, a plurality of domains having different alignment directions of the liquid crystal may be formed in one pixel.

As such, as a means of forming the plurality of domains, a method of forming patterns in the field generating electrode is used. According to the method, the plurality of domains may be formed on the liquid crystal layer by controlling an alignment direction of a liquid crystal by a fringe field which is formed between an edge of a pattern of the field generating electrode and the field generating electrode facing the edge.

The LCD has lower side visibility compared with front visibility such that one pixel is divided into two subpixels and different voltages are applied to the subpixels to solve this problem.

SUMMARY

To make side visibility close to front visibility, in the case of a liquid crystal display ("LCD") in which one pixel is divided into two subpixels and the voltages applied to the two subpixels are differentiated, luminance is increased in a low gray or a high gray such that the gray expression is difficult at the side and the display quality may be deteriorated. Also, when a transmittance change is not clear according to a gray change of the image signal, the target gray change is not expressed such that the display deterioration may be generated.

Accordingly, the invention provides an LCD further clearly expressing a transmittance change according to a gray change while approximating side visibility to front visibility.

The invention decreases a region where light is not transmitted between neighboring pixels of the LCD to increase transmittance.

The invention increases the control force for the liquid crystal molecules to improve the transmittance by a design in a region where the control force for the liquid crystal molecules is decreased such that the transmittance is decreased in the pixel.

An LCD according to an exemplary embodiment of the invention includes a first field generating electrode and an opposed electrode facing the first field generating electrode, a liquid crystal layer interposed between the first field generating electrode and the opposed electrode, a shielding electrode line separated from the first field generating electrode, and a second field generating electrode including a plurality of branch electrodes overlapping the first field generating electrode, wherein the first field generating electrode includes at least one step portion adjacent to and facing the shielding electrode line.

In an exemplary embodiment, the step portion may include a first side extending in a direction crossing a length direction of a branch electrode of the plurality of branch electrodes and a second side which meets the first side at a vertex.

In an exemplary embodiment, the first side may define an angle of about 70 degrees to about 110 degrees with reference to the length direction of the branch electrode.

In an exemplary embodiment, the second side may define an angle of about 70 degrees to about 110 degrees with reference to the first side.

In an exemplary embodiment, the second side may overlap the inside area of the branch electrode or an edge side of the branch electrode.

In an exemplary embodiment, a length of an overlapping region of one branch electrode overlapping the step portion may be about 10 percent (%) to about 90% of an entire length of the branch electrode.

In an exemplary embodiment, the second side may extend along a center line extending in the length direction among the inside area of the branch electrode.

In an exemplary embodiment, the first field generating electrode and the shielding electrode line may be positioned in the same layer.

In an exemplary embodiment, the second field generating electrode may further include a first subpixel electrode and a second subpixel electrode that are applied with different voltages from each other, the first subpixel electrode and the second subpixel electrode may be separated from each other by a gap, and the first field generating electrode may overlap the gap.

In an exemplary embodiment, an overlapping area of the first field generating electrode and the second subpixel electrode may be larger than an overlapping area of the first field generating electrode and the first subpixel electrode.

In an exemplary embodiment, a voltage applied to the first subpixel electrode may be greater than that of the second subpixel electrode.

In an exemplary embodiment, the first field generating electrode and the second field generating electrode may include a plurality of domains in which control directions of liquid crystal molecules of the liquid crystal layer are different from each other.

In an exemplary embodiment, the first field generating electrode may be electrically connected to the first subpixel electrode.

In an exemplary embodiment, an insulating layer positioned between the first field generating electrode and the second field generating electrode may be further included.

In an exemplary embodiment, an LCD according to an exemplary embodiment of the invention includes a first field generating electrode and an opposed electrode facing each other with a liquid crystal layer interposed therebetween, a shielding electrode line separated from the first field generating electrode, and a second field generating electrode including a plurality of branch electrodes overlapping the first field generating electrode, wherein the first field generating electrode includes a step portion in which a length is changed into at least one step shape in a region adjacent to and facing the shielding electrode line.

In an exemplary embodiment, a length of an overlapping region of one branch electrode overlapping the step portion may be about 10% to about 90% of an entire length of the branch electrode.

According to an exemplary embodiment of the invention, the transmittance change according to the gray change may be accurately expressed while approximating the lateral visibility to the front visibility in the LCD. Also, the transmittance may be increased by reducing the region where the light is not transmitted between the neighboring pixels of the LCD. Further, the transmittance may be improved by increasing the control force for the liquid crystal molecules and by reducing the texture in the pixel.

BRIEF DESCRIPTION OF THE DRAWINGS

The above and other exemplary embodiments, advantages and features of this invention will become more apparent by describing in further detailed exemplary embodiments thereof with reference to the accompanying drawings, in which.

DETAILED DESCRIPTION

Figure 1:
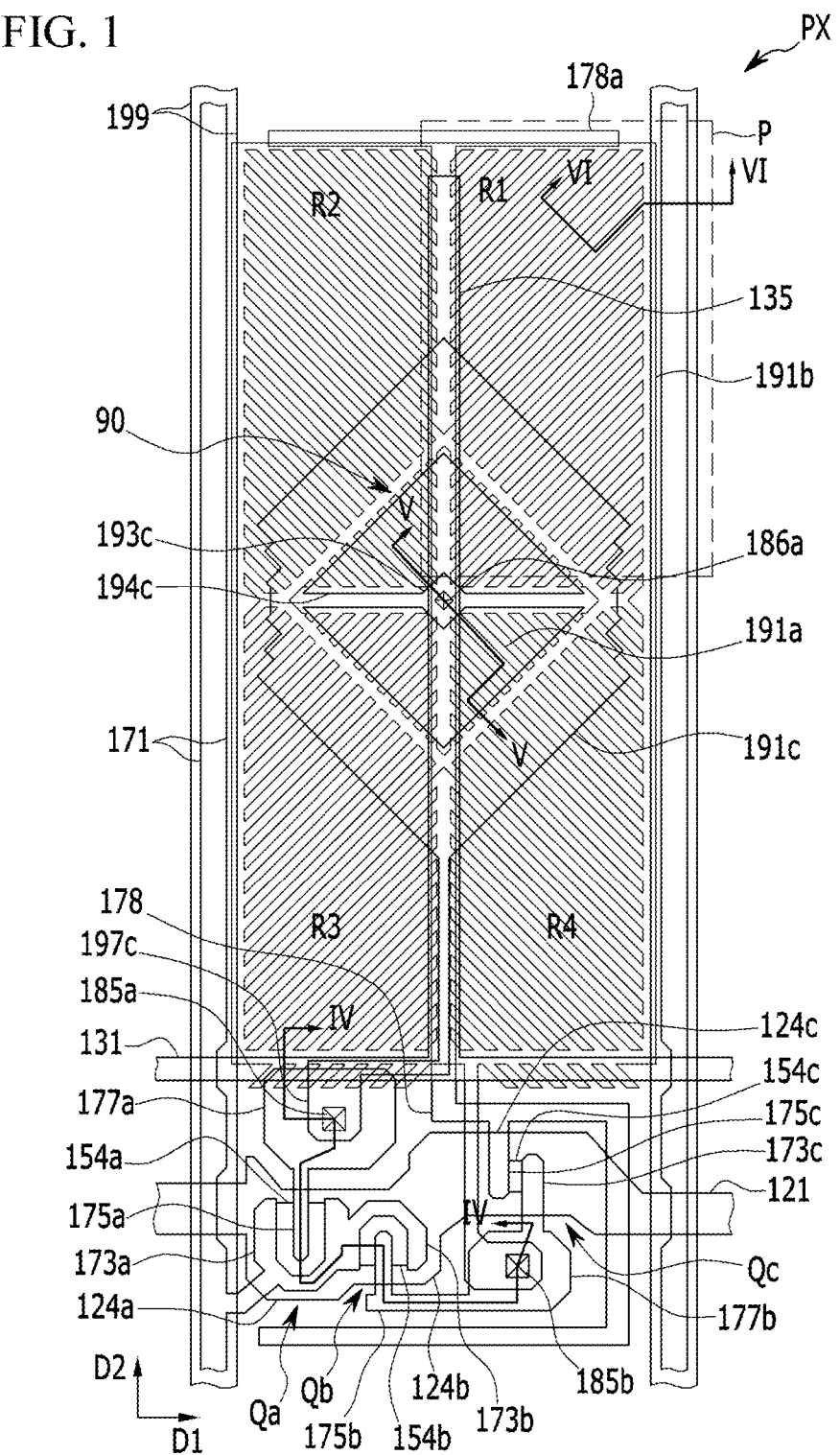
FIG. 1 is a plan view of an exemplary embodiment of one pixel of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on", "connected to" or "coupled to" another element, it can be directly on the other element or intervening elements may also be present. In contrast, when an element is referred to as being "directly on", "directly connected to" or "directly coupled to" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Firstly, a liquid crystal display ("LCD") according to an exemplary embodiment of the invention will be described with reference to FIGS. 1 to 7.

Figure 2:
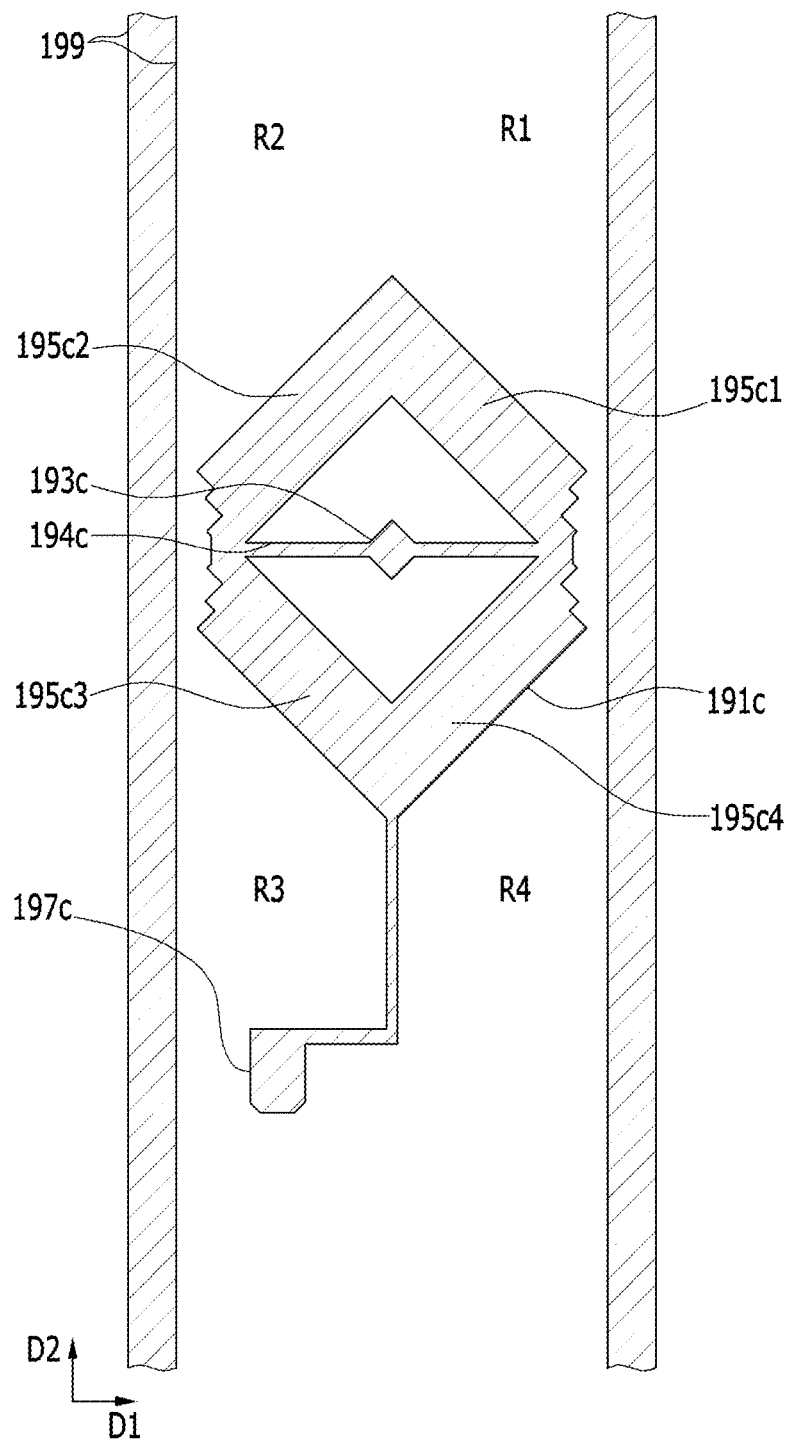
FIG. 2 is a top plan view of a first field generating electrode of the LCD shown in FIG. 1.
Figure 3:
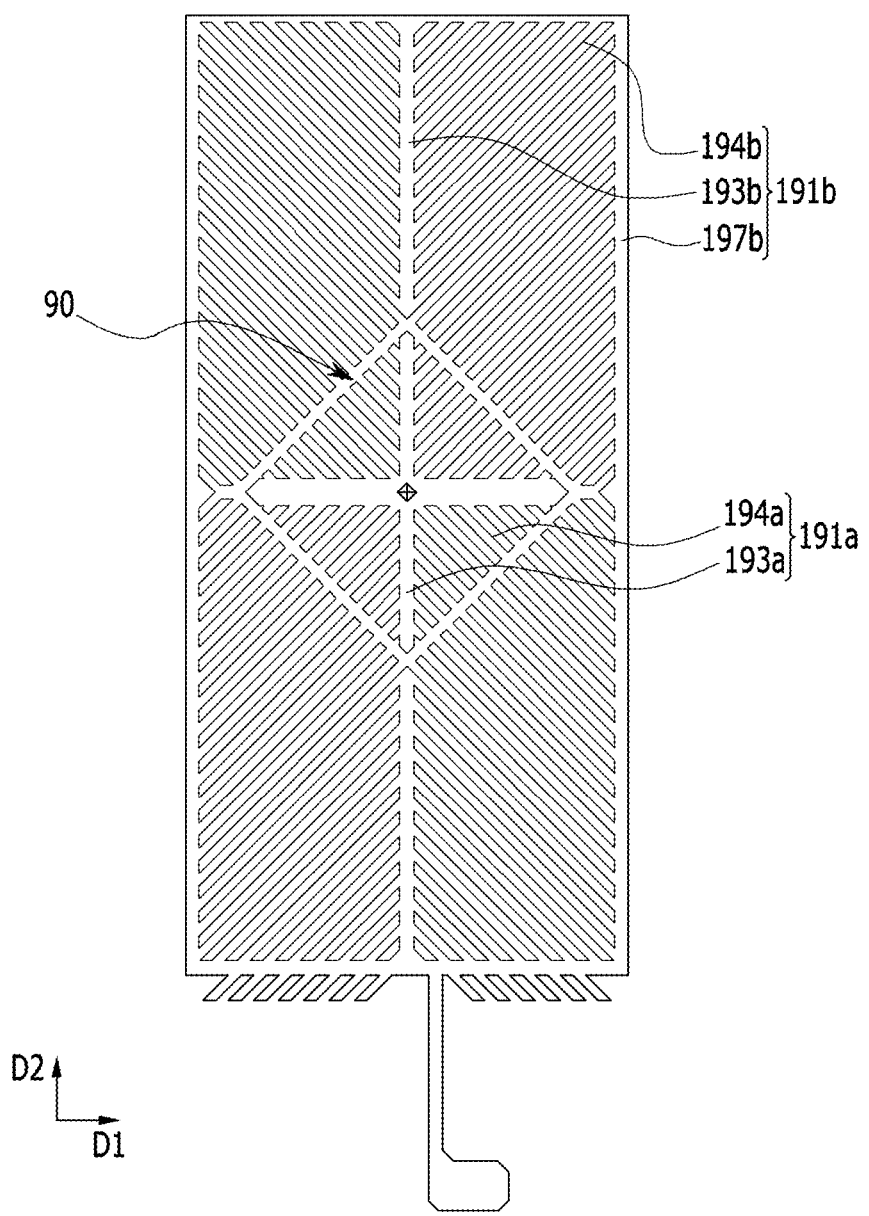
FIG. 3 is a top plan view of a second field generating electrode of the LCD shown in FIG. 1.
Figure 4:
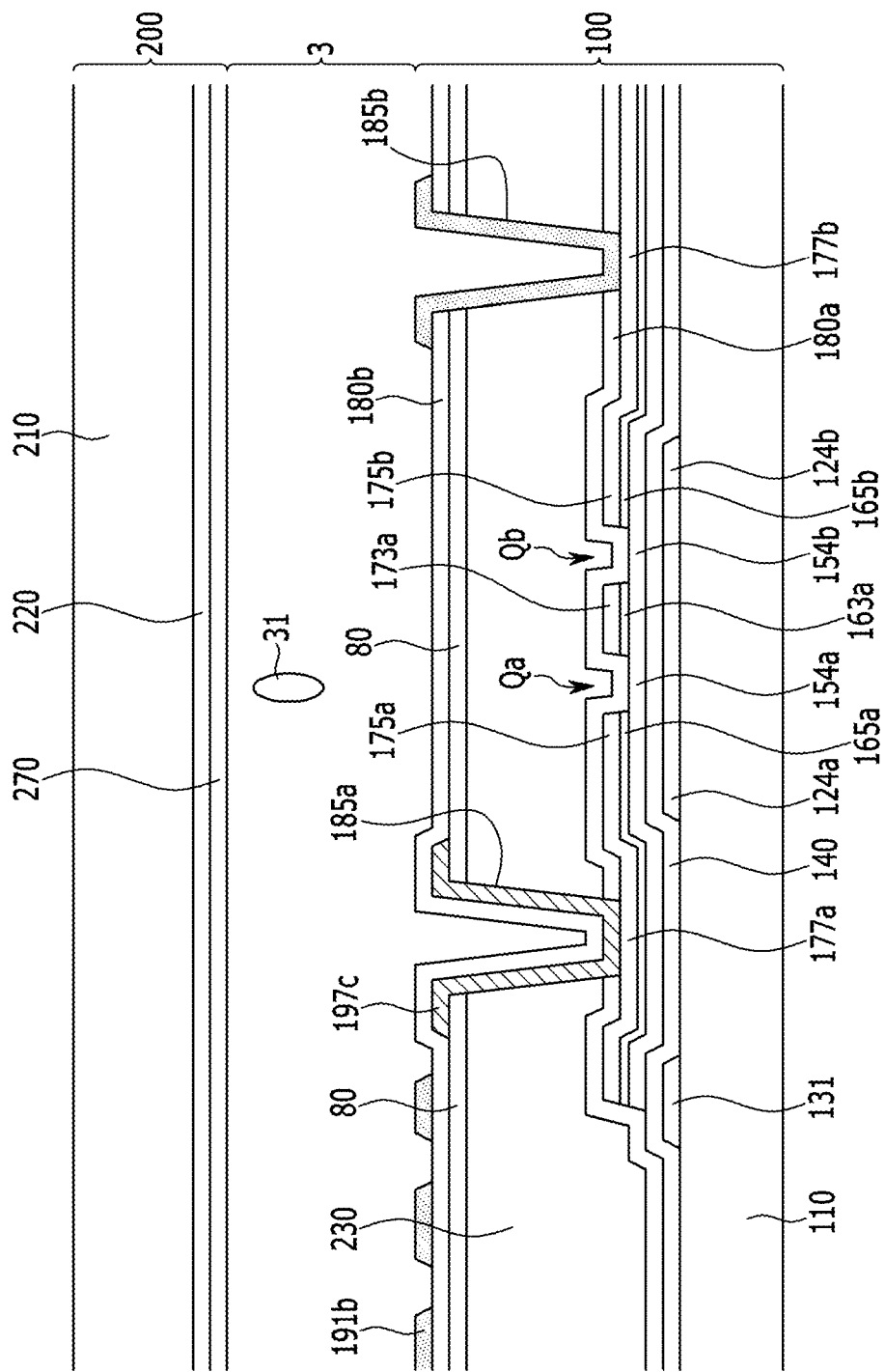
FIG. 4 is a cross-sectional view of the LCD shown in FIG. 1 taken along line IV-IV.
Figure 5:
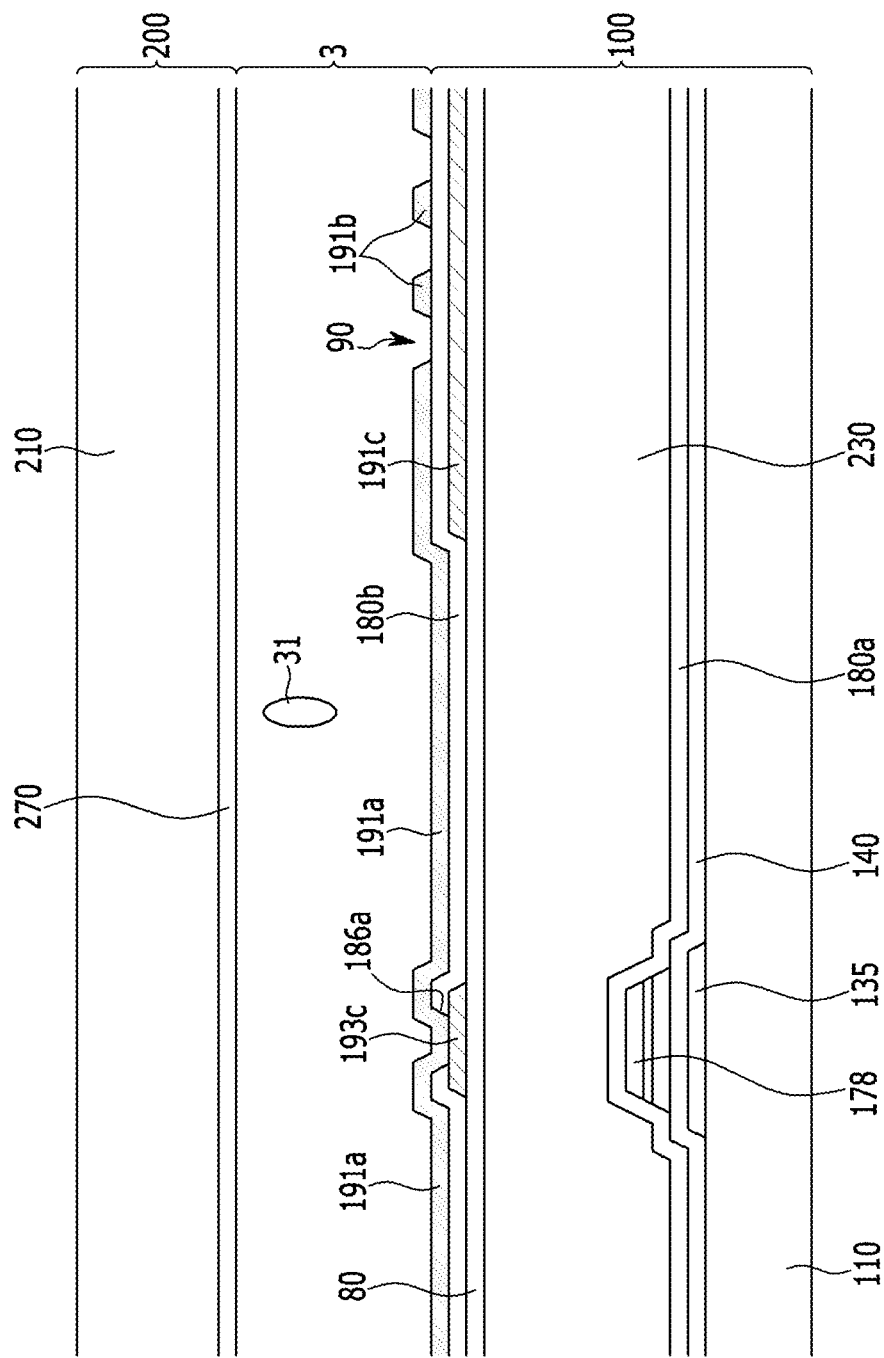
FIG. 5 is a cross-sectional view of the LCD shown in FIG. 1 taken along line V-V.
Figure 6:
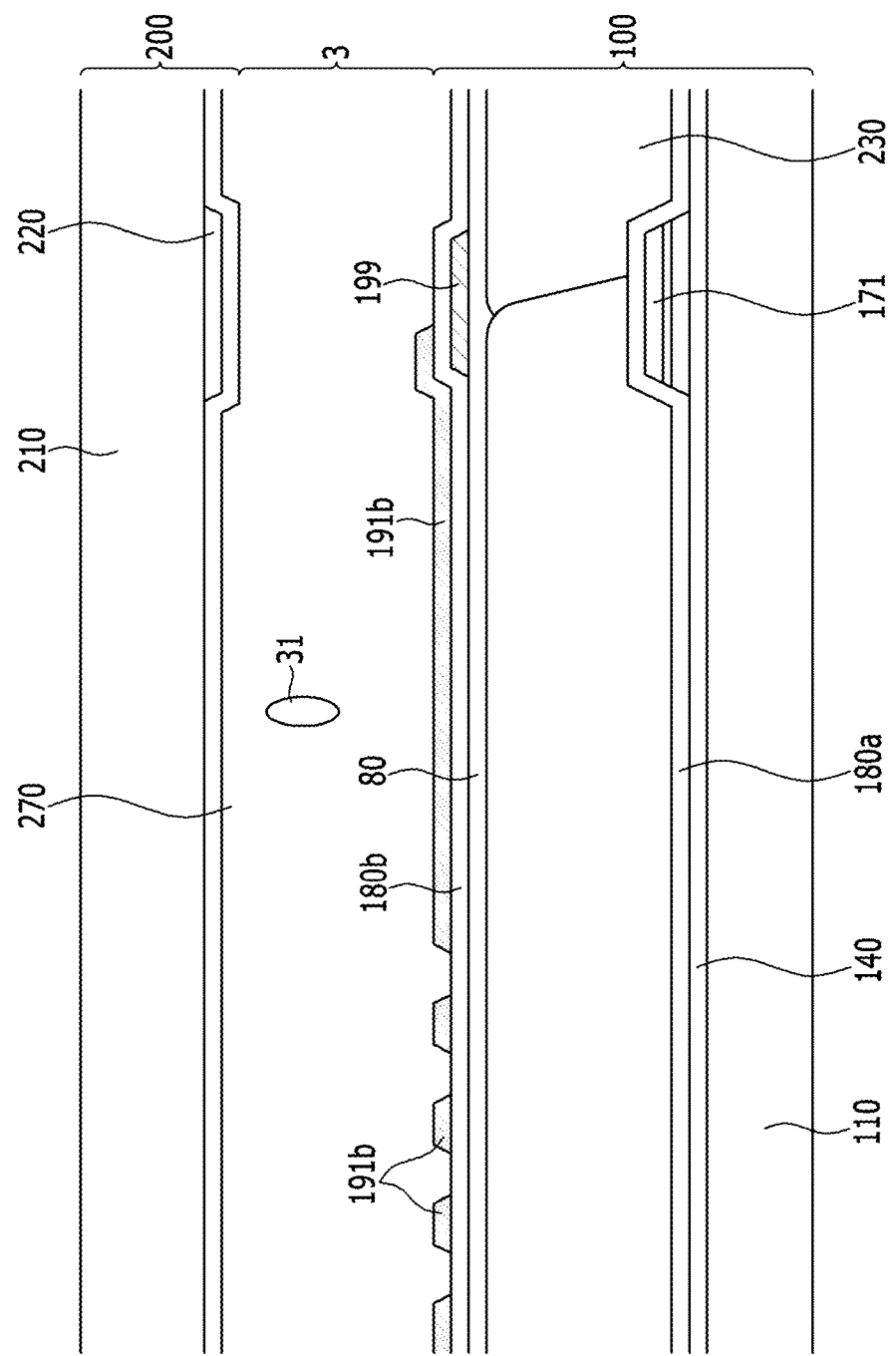
FIG. 6 is a cross-sectional view of the LCD shown in FIG. 1 taken along line VI-VI.
Figure 7:
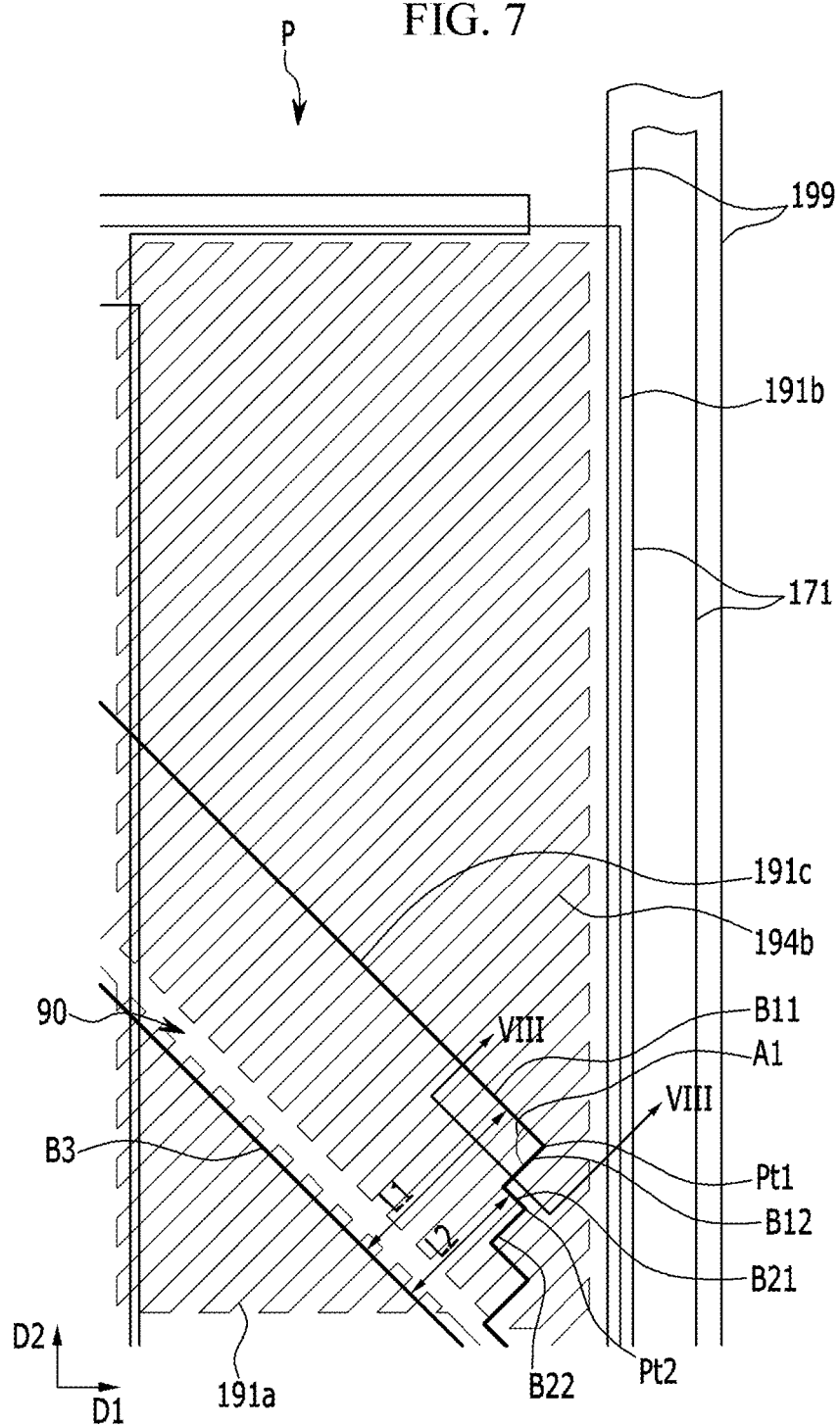
FIG. 7 is an enlarged plan view of a part of one pixel of the LCD shown in FIG. 1.

FIG. 1 is a plan view of one pixel of an LCD according to an exemplary embodiment of the invention, FIG. 2 is a top plan view of a first field generating electrode of the LCD shown in FIG. 1, FIG. 3 is a top plan view of a second field generating electrode of the LCD shown in FIG. 1, FIG. 4 is a cross-sectional view of the LCD shown in FIG. 1 taken along line IV-IV, FIG. 5 is a cross-sectional view of the LCD shown in FIG. 1 taken along line V-V, FIG. 6 is a cross-sectional view of the LCD shown in FIG. 1 taken along line VI-VI, and FIG. 7 is an enlarged plan view of a part P of one pixel of the LCD shown in FIG. 1.

The LCD according to an exemplary embodiment of the invention includes a plurality of pixels PX that are units displaying images and expressing the image of at least one transmittance or luminance according to the gray of one input image signal. A plurality of pixels PX may be arranged having regularity on a plane structure.

Referring to FIGS. 1, 4, 5, and 6, an LCD according to an exemplary embodiment of the invention includes a lower panel 100 and an upper panel 200 facing each other, and a liquid crystal layer 3 interposed between the two display panels 100 and 200 when viewed as a cross-sectional structure.

Firstly, in the upper panel 200, an opposed electrode 270 is positioned on a substrate 210 that may include transparent glass or plastic, for example. The opposed electrode 270 may include a transparent conductor or metal such as indium tin oxide ("ITO") and indium zinc oxide ("IZO"). In an exemplary embodiment, the opposed electrode 270 may be applied with a common voltage, for example.

The opposed electrode 270 may be disposed on an entire surface of the upper panel 200.

In an exemplary embodiment, the upper panel 200 may further include at least one of a color filter (not shown) and a light blocking member 220. In the exemplary embodiment, the color filter may display one of primary colors such as red, green, and blue, for example. However, the invention is not limited thereto, and the color filter may display various other colors. The light blocking member may be referred to as a black matrix, and prevents light leakage between the pixels PX. FIGS. 4 to 6 show an exemplary embodiment in which the upper panel 200 includes the light blocking member 220 and does not include the color filter. In an alternative exemplary embodiment, the light blocking member 220 may be positioned in the lower panel 100 along with the color filter.

When the upper panel 200 includes the color filter or the light blocking member 220, the color filter or the light blocking member 220 may be positioned between the opposed electrode 270 and the substrate 210, and an overcoat (e.g., a capping layer) (not shown) may be positioned between the opposed electrode 270 and the color filter or the light blocking member 220.

In an exemplary embodiment, the liquid crystal layer 3 includes liquid crystal molecules 31, and the liquid crystal molecules 31 may have dielectric anisotropy, in detail, negative dielectric anisotropy, for example. The liquid crystal molecules 31 may be aligned so that long axes thereof are perpendicular to the surface of the two display panels 100 and 200 in the absence of an electric field.

Next, in the lower panel 100, a gate conductor including a gate line 121 and a storage electrode line 131 is positioned on a substrate 110 that may include the transparent glass or plastic, for example.

The gate line 121 mainly extends in a first direction D1 as a horizontal direction, and transmits a gate signal. The gate line 121 includes a first gate electrode 124a, a second gate electrode 124b, and a third gate electrode 124c.

The storage electrode line 131 may mainly extend in the first direction D1 and may transmit a predetermined voltage. The storage electrode line 131 may include a storage electrode 135. The storage electrode 135 may mainly extend in a second direction D2 as a vertical direction. In another exemplary embodiment, the storage electrode line 131 may be omitted.

A gate insulating layer 140 is positioned on the gate conductor.

In an exemplary embodiment, a semiconductor layer including a first semiconductor 154a, a second semiconductor 154b, and a third semiconductor 154c that may include hydrogenated amorphous silicon, polysilicon, or an oxide semiconductor, for example, is positioned on the gate insulating layer 140.

A plurality of ohmic contacts 163a, 165a, and 165b may be positioned on the first semiconductor 154a, the second semiconductor 154b, and the third semiconductor 154c. When the semiconductor layer includes the oxide semiconductor, the ohmic contacts 163a, 165a, and 165b may be omitted.

A data conductor including a data line 171, a first drain electrode 175a, a second drain electrode 175b, a third source electrode 173c, and a reference voltage line 178 is positioned on the ohmic contacts 163a, 165a, and 165b.

The data line 171 mainly extends in the second direction D2 thereby crossing the gate line 121, and transmits a data voltage. The data line 171 may include a first source electrode 173a extending toward the first gate electrode 124a and a second source electrode 173b extending toward the second gate electrode 124b. In an exemplary embodiment, the first source electrode 173a and the second source electrode 173b may be unitary.

Referring to FIGS. 1 and 6, the light blocking member 220 includes a portion covering the data line 171, but the invention is not limited thereto, and the portion covering the data line 171 may be omitted in another exemplary embodiment.

The first drain electrode 175a is divided from the data line 171, and may include a portion facing the first source electrode 173a and an expansion 177a opposite thereto.

The second drain electrode 175b is divided from the data line 171, and may include a portion facing the second source electrode 173b and an expansion 177b connected thereto.

The third source electrode 173c is connected to the second drain electrode 175b. The expansion 177b may be positioned between the third source electrode 173c and the second drain electrode 175b.

The reference voltage line 178 may mainly extend in the second direction D2, and may include a transverse portion 178a periodically disposed and a third drain electrode 175c. The transverse portion 178a may extend in the horizontal direction between the neighboring data lines 171. The third drain electrode 175c may include a portion protruding from the reference voltage line 178 and facing the third source electrode 173c.

The first gate electrode 124a, the first source electrode 173a, and the first drain electrode 175a provide a first thin film transistor ("TFT") Qa along with the first semiconductor 154a, and the channel of the TFT is provided in the semiconductor 154a between the first source electrode 173a and the first drain electrode 175a. The second gate electrode 124b, the second source electrode 173b, and the second drain electrode 175b provide a second TFT Qb along with the second semiconductor 154b, and the channel of the TFT is provided in the semiconductor 154b between the second source electrode 173b and the second drain electrode 175b. The third gate electrode 124c, the third source electrode 173c, and the third drain electrode 175c provide a third TFT Qc along with the third semiconductor 154c, and the channel of the TFT is provided in the semiconductor 154c between the third source electrode 173c and the third drain electrode 175c.

The light blocking member 220 may include a portion covering the TFTs Qa, Qb, and Qc.

In an exemplary embodiment, a first passivation layer 180a that may include an inorganic insulator such as silicon nitride or silicon oxide is positioned on the data conductor and the exposed portion of the semiconductor layer.

The color filter 230 may be positioned on the first passivation layer 180a. In an exemplary embodiment, the color filter may display one of the primary colors such as red, green, and blue. However, the invention is not limited thereto, and the color filter may display various other colors.

The light blocking member (not shown) may be positioned on a region where the color filter 230 is not positioned and the portion of the color filter 230. The light blocking member is also referred to as the black matrix, and may prevent light leakage between the pixels. In an alternative exemplary embodiment, at least one of the color filter 230 and the light blocking member may be positioned in the upper panel 200.

When the lower panel 100 includes the color filter 230, the overcoat (the capping layer) 80 may be positioned on the color filter 230. The overcoat 80 may prevent the color filter 230 from being lifted, and may suppress contamination of the liquid crystal layer 3 by an organic material such as a solvent from the color filter 230, thereby problems such as an afterimage that may be generated under driving may be prevented.

A contact hole 185a exposing the expansion 177a of the first drain electrode 175a is defined in the overcoat 80, the color filter 230, and the first passivation layer 180a.

A first electrode layer including a first field generating electrode 191c and a shielding electrode line 199 is positioned on the overcoat 80.

Referring to FIG. 2, the first field generating electrode 191c includes a plurality of electrode parts 195c1, 195c2, 195c3, and 195c4 connected to each other. In the LCD according to the illustrated exemplary embodiment, the first field generating electrode 191c of one pixel PX includes four electrode parts 195c1, 195c2, 195c3, and 195c4, but the number of first electrode parts is not limited thereto.

The electrode parts 195c1, 195c2, 195c3, and 195c4 may be respectively be parallelogrammic having an oblique edge that is inclined in the first direction D1. In an exemplary embodiment, an angle between the oblique edge of the electrode parts 195c1, 195c2, 195c3, and 195c4 and the first direction D1 may be about 45 degrees or 135 degrees, for example, but it is not limited thereto.

The plurality of electrode parts 195c1, 195c2, 195c3, and 195c4 included in the first field generating electrode 191c of one pixel PX are respectively positioned in different domains R1, R2, R3, and R4. The domains R1, R2, R3, and R4 may be divided in the direction that the liquid crystal molecules 31 of the liquid crystal layer 3 corresponding to the pixel PX are controlled.

In one pixel PX, the neighboring electrode parts 195c1, 195c2, 195c3, and 195c4 are symmetrical to each other with respect to the boundaries between the neighboring domains R1, R2, R3, and R4 and may be physically connected to each other.

Referring to FIG. 2, the first field generating electrode 191c may further include a connection 194c that is positioned at the center portion of an opening region of one pixel PX. The connection 194c may connect two portions that are separated from each other in the first field generating electrode 191c. The connection 194c may extend approximately in the first direction D1. In an alternative exemplary embodiment, the connection 194c may extend approximately in the second direction D2. According to another exemplary embodiment of the invention, the connection 194c may include both a portion extending in the first direction D1 and a portion extending in the second direction D2.

The connection 194c may include an expansion 193c that is positioned at the center portion thereof.

Referring to FIG. 2, the first field generating electrode 191c may further include a protrusion 197c extending toward the first TFT Qa. Referring to FIGS. 1 and 4, the protrusion 197c is physically and electrically connected to the expansion 177a of the first drain electrode 175a of the first TFT Qa through the contact hole 185a thereby receiving the voltage. The portion of the protrusion 197c may extend in the second direction D2 along an approximate longitudinal center of the pixel PX.

The shielding electrode line 199 is separated from the first field generating electrode 191c and may mainly extend in the second direction D2. The shielding electrode line 199 may transmit a common voltage. The shielding electrode line 199 overlaps the data line 171 and may completely cover the data line 171. A width of the shielding electrode line 199 taken along a horizontal direction in a plan view may be generally larger than a width of the data line 171.

The shielding electrode line 199 shields an electric field from the data line 171, thereby preventing the light leakage between the neighboring pixels PX. Accordingly, as shown in FIG. 6, the separate light blocking member 220 overlapping the data line 171 may be removed such that the aperture ratio and transmittance of the pixel PX may be increased.

A second passivation layer 180b including the inorganic insulating material is positioned on the overcoat 80 and the first electrode layer. A contact hole 186a exposing the expansion 193c of the first field generating electrode 191c is defined in the second passivation layer 180b. A contact hole 185b exposing the expansion 177b of the second drain electrode 175b is defined in the second passivation layer 180b, the overcoat 80, the color filter 230 and the first passivation layer 180a.

A second electrode layer including a second field generating electrode (191a and 191b) is positioned on the second passivation layer 180b.

The second field generating electrode (191a and 191b) may include a first subpixel electrode 191a and a second subpixel electrode 191b.

Referring to FIGS. 1 and 3, the first subpixel electrode 191a may be positioned at the center portion of the opening region of the pixel PX.

In an exemplary embodiment, the first subpixel electrode 191a may provide a rhombus having an edge that is inclined with respect to the first direction D1. The first subpixel electrode 191a may include a cross stem 193a including a longitudinal portion approximately parallel to the first direction D1 and a transverse portion approximately parallel to the second direction D2, and a plurality of branch electrodes 194a extending from the cross stem 193a. The cross stem 193a corresponds to the boundaries between the neighboring domains R1, R2, R3, and R4. The branch electrodes 194a positioned at the different domains R1, R2, R3, and R4 of one pixel PX may extend in different directions. In an exemplary embodiment, the extending directions of the branch electrodes 194a are inclined in the first direction D1, and inclination angles may be about 45 degrees or about 135 degrees.

The first subpixel electrode 191a is physically and electrically connected to the expansion 193c of the first field generating electrode 191c through the contact hole 186a of the second passivation layer 180b, thereby receiving the voltage.

The second subpixel electrode 191b may enclose the first subpixel electrode 191a with a gap 90 defined therebetween.

The second subpixel electrode 191b may include a plurality of branch electrodes 194b. The branch electrodes 194b positioned at the different domains R1, R2, R3, and R4 of one pixel PX may extend in different directions. The extending directions of the branch electrodes 194b are inclined with respect to the first direction D1, and the inclination angle may be about 45 degrees or about 135 degrees.

The second subpixel electrode 191b may further include an outer stem 197b provided along the edge of the opening region of the pixel PX, and a stem 193b positioned between the neighboring subregions R1, R2, R3, and R4. The stem 193b may include a portion approximately extending in the second direction D2, and may correspond to the boundaries between the neighboring domains R1, R2, R3, and R4. The stem 193b and the outer stem 197b of the second subpixel electrode 191b are connected to the branch electrode 194b.

In an exemplary embodiment, the first electrode layer and the second electrode layer may include the transparent conductive material such as ITO or IZO.

Referring to FIGS. 1 and 7, the first field generating electrode 191c of the first electrode layer according to an exemplary embodiment of the invention partially overlaps the portion of the second subpixel electrode 191b of the second electrode layer. In detail, each of the electrode parts 195c1, 195c2, 195c3, and 195c4 of the first field generating electrode 191c overlaps the portion of the branch electrode 194b of the second subpixel electrode 191b in each of the domains R1, R2, R3, and R4.

The first field generating electrode 191c also overlaps the gap 90 between the first subpixel electrode 191a and the second subpixel electrode 191b. In detail, the first field generating electrode 191c may overlap the entire gap 90 between the first subpixel electrode 191a and the second subpixel electrode 191b to be covered. A margin completely covers the gap 90 by the first field generating electrode 191c in a manufacturing process such that the first field generating electrode 191c may also overlap the portion of the branch electrode 194a of the first subpixel electrode 191a. However, for each of the domains R1, R2, R3, and R4, an area of the overlapping region of the first field generating electrode 191c and the first subpixel electrode 191a is smaller than an area of the overlapping region of the first field generating electrode 191c and the second subpixel electrode 191b.

Particularly, referring to FIG. 7, the first field generating electrode 191c includes a main edge B11 positioned at one of the domains R1, R2, R3, and R4 of one pixel PX and crossing a plurality of branch electrodes 194b of the second subpixel electrode 191b. The angle between the main edge B11 and the branch electrode 194b may be from about 70 degrees to about 110 degrees, in detail, about 90 degrees.

The main edge B11 extends to a vertex Pt1 facing the shielding electrode line 199, thereby meeting a sub-edge B12 in the vertex Pt1. In the vertex Pt1, an angle A1 between the main edge B11 and the sub-edge B12 may be from about 70 degrees to about 110 degrees, in detail, about 90 degrees. Accordingly, the main edge B11 and the sub-edge B12 provide one step portion near the vertex Pt1. The sub-edge B12 may extend substantially parallel to the edge of the branch electrode 194b.

The vertex Pt1 may be provided at the position of one branch electrode 194b. That is, the vertex Pt1 may be provided at the position corresponding to the inside area of one branch electrode 194b and may be aligned to the edge side of the branch electrode 194b. FIG. 7 shows an exemplary embodiment in which the vertex Pt1 is aligned to a right edge side of one branch electrode 194b thereby overlapping the edge side. Accordingly, the sub-edge B12 overlaps the edge side of the corresponding branch electrode 194b and may be extended.

According to an exemplary embodiment of the invention, the first field generating electrode 191c may include two or more step portions for one of the domains R1, R2, R3, and R4 at the position that is adjacent to and faces the shielding electrode line 199, as shown in FIG. 7. FIG. 7 shows an exemplary embodiment in which about three step portions exist for one domain of the domains R1, R2, R3, and R4.

In detail, the sub-edge B12 meeting the vertex Pt1 is bent toward the shielding electrode line 199 before meeting the gap 90, thereby providing the sub-edge B21. The bend angle of the sub-edge B12 may be from about 70 degrees to about 110 degrees, in detail about 90 degrees, and accordingly the sub-edge B21 may extend substantially parallel to the main edge B11. The sub-edge B21 extends to another vertex Pt2 positioned at the region that is adjacent to and faces the shielding electrode line 199 and meets the sub-edge B22 at the vertex Pt2. In the vertex Pt2, the angle between the sub-edge B21 and the sub-edge B22 may also be about 70 degrees to about 110 degrees, in detail, about 90 degrees. Accordingly, two sub-edges B21 and B22 may provide another step portion near the vertex Pt2. The sub-edge B22 may extend substantially parallel to the edge of the branch electrode 194b.

The vertex Pt2 may also be positioned at the position overlapping one branch electrode 194b. FIG. 7 shows an exemplary embodiment in which the vertex Pt2 overlaps the inside area of the branch electrode 194b differently from the vertex Pt1.

In a like manner, the sub-edge B22 meeting the vertex Pt2 is also bent toward the shielding electrode line 199 before meeting the gap 90 to provide another sub-edge meeting another vertex (not shown), thereby providing another step portion.

A number of the step portions or the vertexes Pt1, Pt2, . . . positioned at one domain or R1, R2, R3, and R4 of the pixel PX may be more than one. When the number of step portions or vertexes Pt1, Pt2, . . . is plural, the step portions or the vertexes Pt1, Pt2, . . . may be disposed one by one for the branch electrode 194b, or two or more branch electrodes 194b of the second subpixel electrode 191b overlapping each step portion or vertex. In an exemplary embodiment, in one domain of R1, R2, R3, and R4, an interval between a plurality of step portions or vertexes Pt1, Pt2, . . . may not be uniform.

Referring to FIG. 7, the first field generating electrode 191c may include a portion of which a length is changed in a step shape at the region adjacent to and facing the shielding electrode line 199. That is, when the main edge B11 of the first field generating electrode 191c and the inner edge B3 facing thereto provide a first length L1, the first field generating electrode 191c may include the portion having a second length L2 smaller than the first length L1 at the region adjacent to and facing the shielding electrode line 199. The inner edge B3 of the first field generating electrode 191c is not bent and may extend in the predetermined direction, that is, the direction that is inclined with reference to the first direction D1.

As described above, in the region adjacent to and facing the shielding electrode line 199, the first field generating electrode 191c positioned in the same layer as the shielding electrode line 199 includes the step portion or the length that is changed into the step shape such that the first field generating electrode 191c and the shielding electrode line 199 may be substantially constantly maintained, thereby a short between the first field generating electrode 191c and the shielding electrode line 199 may be prevented.

Alignment layers (not shown) may be disposed on inner surfaces of the display panels 100 and 200, and may be vertical alignment layers.

In an exemplary embodiment, at least one of the liquid crystal layer 3 and the alignment layer may include a photo-reactive material, for example, a reactive mesogen.

In an exemplary embodiment, polarizers (not shown) may be provided on the outer surfaces of the panels 100 and 200, and it is preferable that transmissive axes of the two polarizers may be orthogonal to each other and that one transmissive axis of the axes is parallel to the first direction D1. However, the invention is not limited thereto, and a polarizer may be disposed only on an outer surface of one of the two panels 100 and 200.

Next, an operation of the LCD according to an exemplary embodiment of the invention will be described with reference to FIGS. 8 to 10 along with FIGS. 1 to 7.

When a gate-on voltage is applied to the gate line 121, the gate-on voltage is applied to the first gate electrode 124a, the second gate electrode 124b, and the third gate electrode 124c such that the first TFT Qa, the second TFT Qb, and the third TFT Qc are turned on. Thus, the data voltage applied to the data line 171 is applied to the first field generating electrode 191c and the second subpixel electrode 191b of the second field generating electrode through the turned-on first TFT Qa and second TFT Qb. The voltage applied to the first field generating electrode 191c is applied to the first subpixel electrode 191a of the second field generating electrode through the contact hole 186a. Accordingly, the first subpixel electrode 191a and the second subpixel electrode 191b may be supplied with a voltage having the substantially same magnitude. However, the voltage applied to the second subpixel electrode 191b is divided through the third TFT Qc that is connected in series to the second TFT Qb. Accordingly, the voltage that is finally applied to the second subpixel electrode 191b may be smaller than the voltage applied to the first subpixel electrode 191a.

Referring to FIG. 1, each of the domains R1, R2, R3, and R4 of the opening region of one pixel PX of the LCD according to an exemplary embodiment of the invention may be divided into a region where only the first subpixel electrode 191a is positioned, a region where only the second subpixel electrode 191b is positioned, and a region where the second subpixel electrode 191b and the first field generating electrode 191c overlap each other.

The first subpixel electrode 191a generates the electric field to the liquid crystal layer 3 along with the opposed electrode 270 of the upper panel 200 in the region where only the first subpixel electrode 191a is positioned. Likewise, the second subpixel electrode 191b generates the electric field to the liquid crystal layer 3 along with the opposed electrode 270 of the upper panel 200 in the region where only the second subpixel electrode 191b is positioned. In this case, the liquid crystal molecules 31 of the different domains R1, R2, R3, and R4 tend to be inclined in different directions by the fringe field generated by the edge sides of the branch electrode 194a of the first subpixel electrode 191a and the branch electrode 194b of the second subpixel electrode 191b. In detail, the liquid crystal molecules 31 tend to be inclined to the inner side of the branch electrodes 194a and 194b by the fringe field generated by the edge side of the branch electrodes 194a and 194b, but the liquid crystal molecules 31 are resultantly inclined in the length direction of the branch electrodes 194a and 194b by the influence of the liquid crystal molecules 31 that tend to be inclined together in the narrow region.

As described above, the inclinations of the liquid crystal molecules 31 are different in the plurality of domains R1, R2, R3, and R4, thereby realizing a wide viewing angle. In an exemplary embodiment, for the fast response speed of the liquid crystal molecule 31, the liquid crystal molecules 31 may be initially aligned with a pretilt in the length direction of the branch electrodes 194a and 194b in absence of the electric field to the liquid crystal layer 3. In this case, the liquid crystal layer 3 or the alignment layer may further include an alignment assistance agent that is hardened by light for the pretilt of the liquid crystal molecules 31.

In the overlapping region of the second subpixel electrode 191b and the first field generating electrode 191c, along with the electric field generated between the branch electrode 194b of the second subpixel electrode 191b and the opposed electrode 270 of the upper panel 200, the liquid crystal molecules 31 of the liquid crystal layer 3 are arranged by the electric field generated between the first field generating electrode 191c positioned between the branch electrode 194b of the second subpixel electrode 191b and the opposed electrode 270. The liquid crystal molecules 31 are slanted in the length direction of the branch electrode 194b as described above. However, in the overlapping region of the second subpixel electrode 191b and the first field generating electrode 191c, the electric field, which is stronger than the electric field in the region where only the second subpixel electrode 191b is positioned but is weaker than the electric field in the region where only the first subpixel electrode 191a is positioned, is applied to the liquid crystal layer 3 because of the influence due to the electric field by the first field generating electrode 191*c* that may be applied with the higher voltage than the second subpixel electrode 191*b*.

As described above, the LCD according to an exemplary embodiment of the invention is operated with the divided regions having the different magnitudes of the electric field applied to the liquid crystal layer 3 of one pixel PX, thereby the inclination angle of the liquid crystal molecules 31 may be different in each region and the luminance of each region may be different. Like this, when displaying the image by dividing one pixel PX into three or more regions having different luminance, the change of the transmittance according to the gray of the input image signal may be smoothly controlled. Also, it may be prevented that the transmittance according to the gray change in the low gray and the high gray when viewing laterally is sharply changed, thereby the gray may be accurately expressed in the low gray and the high gray while making side visibility similar to front visibility.

Particularly, according to an exemplary embodiment of the invention, as described above, the first field generating electrode 191*c* provides the step portion at the edge portion of the opening region of the pixel PX, and the main edge B11 and the sub-edge B12 connected thereto may define an angle of about 70 degrees to about 110 degrees, in detail, about 90 degrees. Accordingly, the edge side of the first field generating electrode 191*c* defines an angle of about 70 degrees to about 110 degrees, in detail, about 90 degrees, with respect to the edge side of the branch electrode 194*b* overlapping thereto, or may extend in parallel with the edge side of the branch electrode 194*b*.

Figure 8:
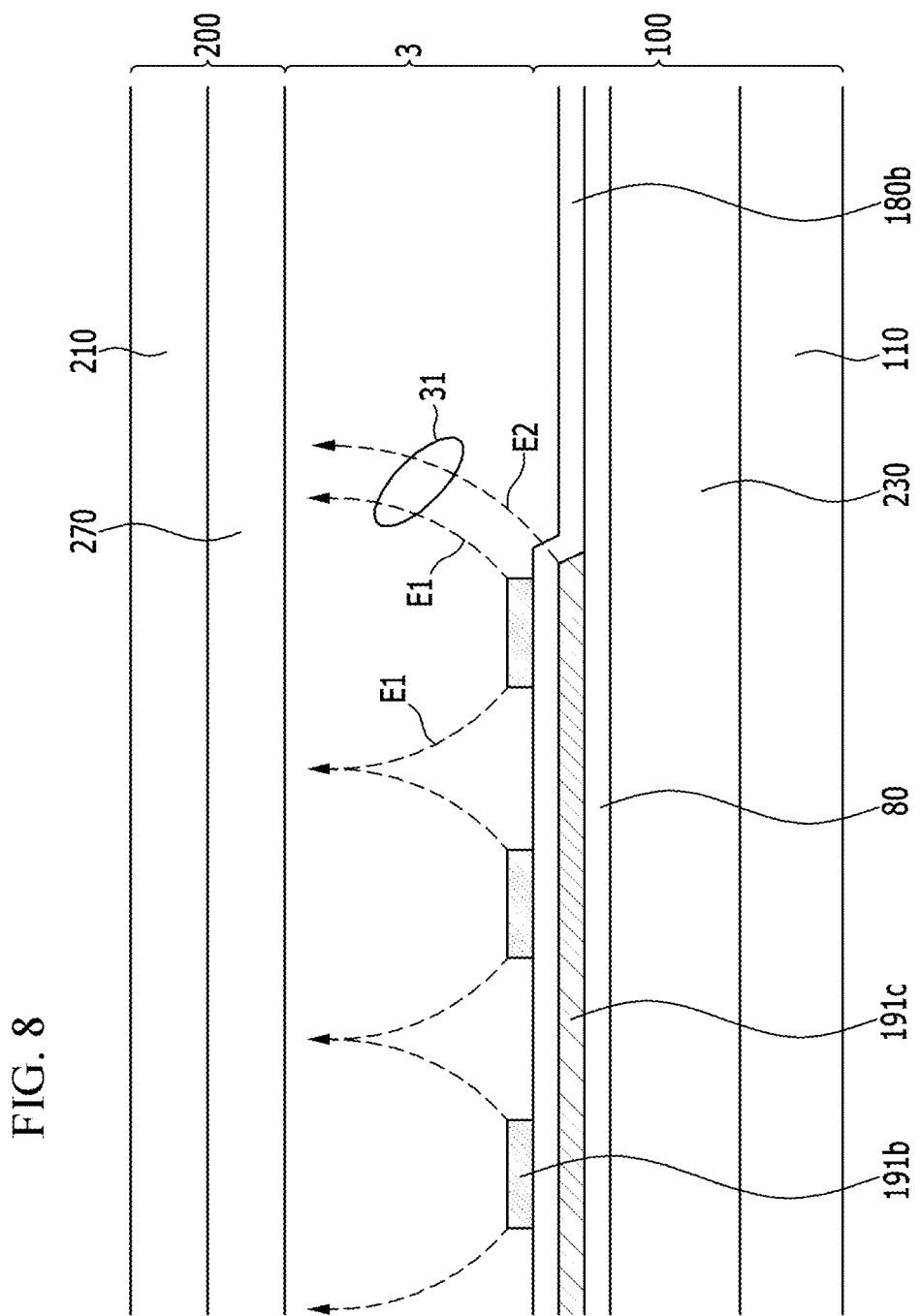
FIG. 8 is a cross-sectional view of the LCD shown in FIG. 7 taken along line VIII-VIII.

FIG. 8 is a cross-sectional view of the LCD shown in FIG. 7 taken along line VIII-VIII, Referring to FIG. 8, the direction of the fringe field E1 generated by the edge side of the branch electrode 194*b* of the second subpixel electrode 191*b* approximately accords with the direction of the fringe field E2 generated by the sub-edge B12 of the first field generating electrode 191*c*. That is, because the first field generating electrode 191*c* and the shielding electrode line 199 are positioned in the same layer, the first field generating electrode 191*c* and the shielding electrode line 199 must be maintained with the constant interval to prevent the short therebetween, and according to an exemplary embodiment of the invention, in the adjacent region of the first field generating electrode 191*c* and the shielding electrode line 199, the direction of the electric field generated by the first field generating electrode 191*c* and the direction of the electric field generated by the second subpixel electrode 191*b* accord with each other such that the control force for the liquid crystal molecules 31 may be increased and the texture due to the disordered liquid crystal molecules 31 may be reduced. Accordingly, the transmittance in the pixel PX may be further increased.

Also, according to an exemplary embodiment of the invention, the first field generating electrode 191*c* overlaps the gap 90 between the first subpixel electrode 191*a* and the second subpixel electrode 191*b*. Therefore, the electric field is generated to the liquid crystal layer 3 corresponding to the gap 90 between the first field generating electrode 191*c* and the opposed electrode 270 for the liquid crystal molecules 31 to be controlled such that the texture that may be generated near the gap 90 may be prevented and the transmittance of the pixel PX may be further increased.

Figure 9:
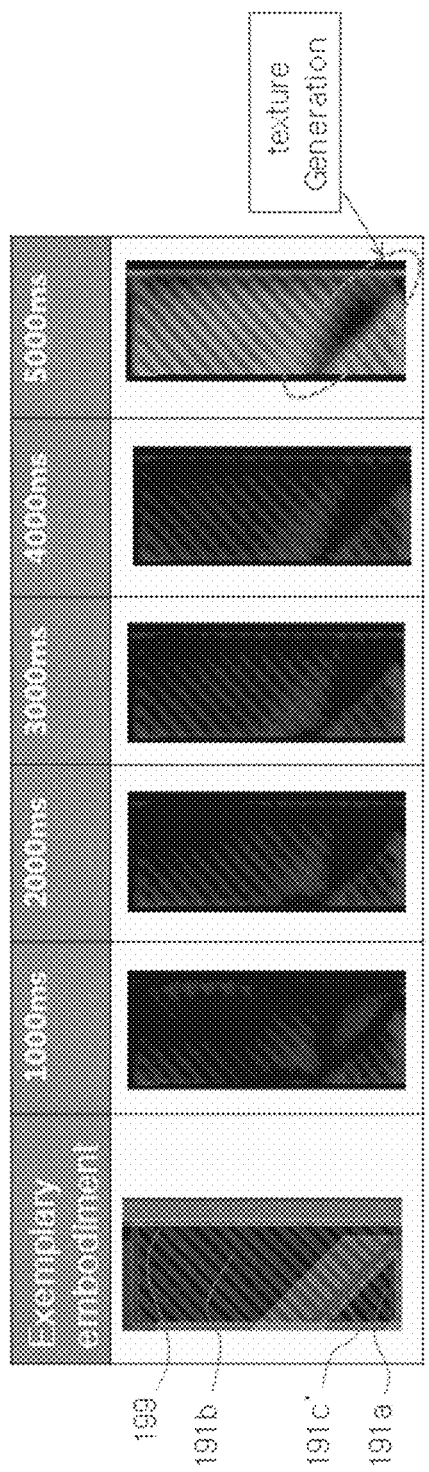
FIG. 9 is a view showing an exemplary embodiment of a transmittance change according to time passage after applying a voltage to one pixel of the LCDs according to the invention and another comparative example.
Figure 10:
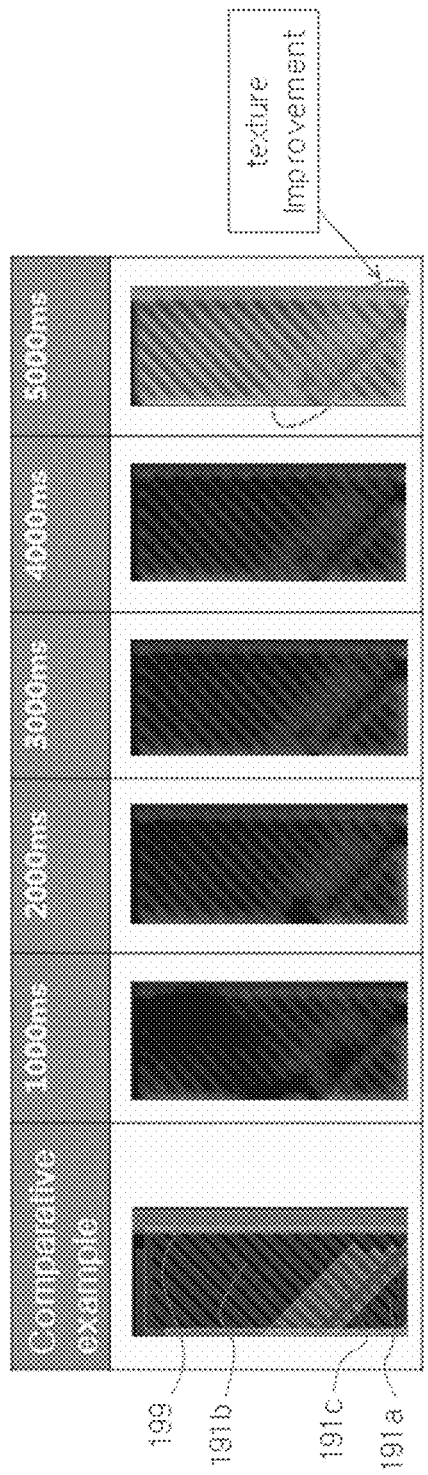
FIG. 10 is a view showing an exemplary embodiment of a transmittance change according to time passage after applying a voltage to one pixel of the LCD according to the invention.

FIG. 9 is a view showing a transmittance change according to time passage after applying a voltage to one pixel of the LCDs according to an exemplary embodiment of the invention and another comparative example, and FIG. 10 is a view showing a transmittance change according to time passage after applying a voltage to one pixel of the LCD according to an exemplary embodiment of the invention.

Firstly, referring to FIG. 9, differently from an exemplary embodiment of the invention, after applying the voltage to the first subpixel electrode 191*a* and the second subpixel electrode 191*b* of the LCD including the first field generating electrode 191*c*' without the step portion in the region adjacent to the shielding electrode line 199, it may be confirmed that the texture of the large area may be generated in the adjacent region of the first field generating electrode 191*c*' and the shielding electrode line 199 as time passes.

However, referring to FIG. 10, like an exemplary embodiment of the invention, after applying the voltage to the first subpixel electrode 191*a* and the second subpixel electrode 191*b* of the LCD including the first field generating electrode 191*c* having at least one step portion in the region adjacent to the shielding electrode line 199, it may be confirmed that little texture is generated in the adjacent region of the first field generating electrode 191*c* and the shielding electrode line 199 as time passes, thereby the transmittance of the pixel PX may be improved.

Next, the LCD according to an exemplary embodiment of the invention will be described with reference to FIG. 11 along with FIGS. 1 to 8. The same constituent elements as of the previous exemplary embodiment are indicated by the same reference numerals, and the same description is omitted.

Figure 11:
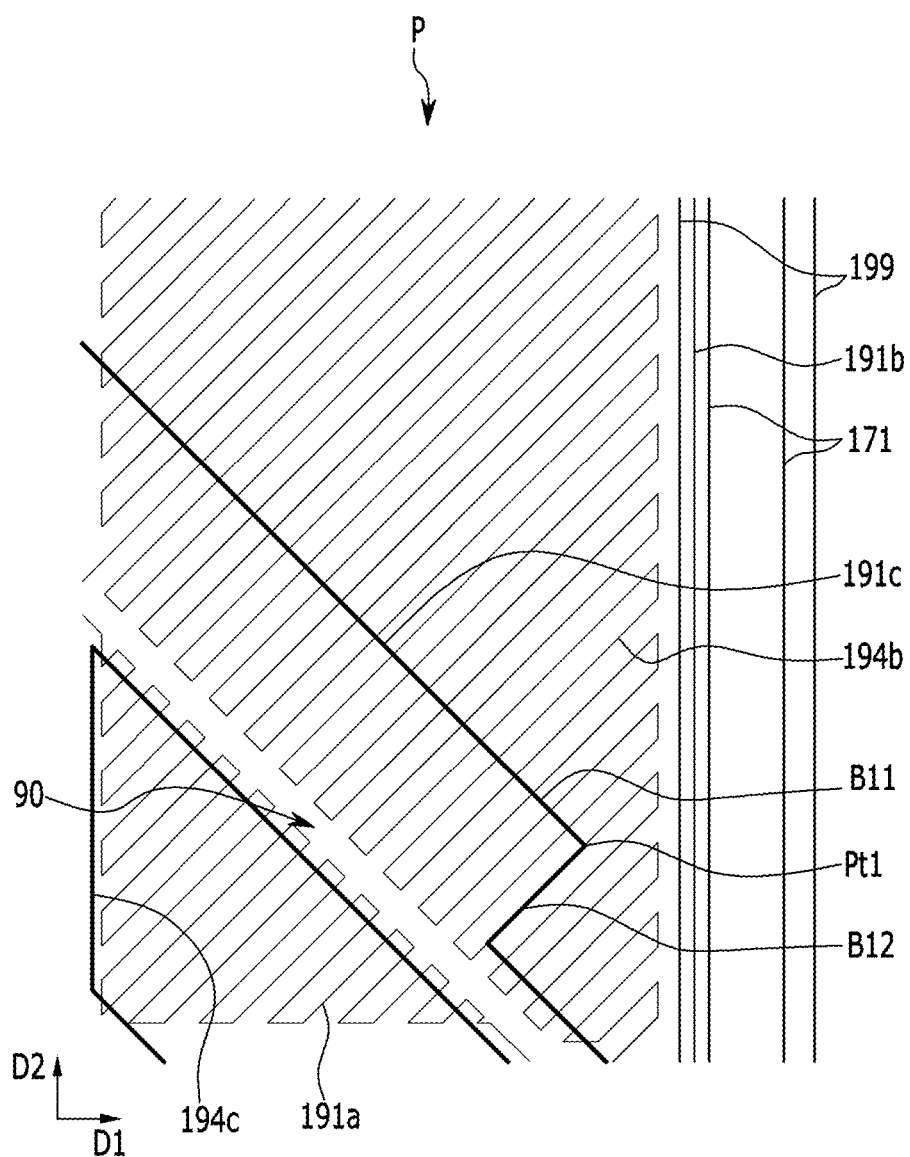
FIG. 11 is a plan view of an exemplary embodiment of a part of one pixel of an LCD according to the invention.

FIG. 11 is a plan view of a part P of one pixel of an LCD according to an exemplary embodiment of the invention, Referring to FIG. 11, the LCD according to an exemplary embodiment of the invention is the same as most of the LCD according to the exemplary embodiment shown in FIGS. 1 to 8, but the shape of the first field generating electrode 191*c* may be different.

The first field generating electrode 191*c* may include the connection 194*c* positioned about at the center of the opening region of one pixel PX. The connection 194*c* may connect two portions that are separated from each other in the first field generating electrode 191*c*, and may extend about in the second direction D2.

According to an exemplary embodiment of the invention, the first field generating electrode 191*c* may only include one step portion for one domain of R1, R2, R3, and R4 at the position adjacent to and facing the shielding electrode line 199. That is, the first field generating electrode 191*c* may only include one vertex Pt1 (refer to FIG. 7) for one domain of R1, R2, R3, and R4 at the position adjacent to the shielding electrode line 199. Accordingly, in the adjacent region of the first field generating electrode 191*c* and the shielding electrode line 199, the process to provide the step portion in the first field generating electrode 191*c* may be simplified and the patterning of the first electrode layer including the first field generating electrode 191*c* may be substantially easy.

According to an exemplary embodiment of the invention, a length of the overlapping area of the step portion and the branch electrode 194*b* for one branch electrode 194*b* overlapping the step portion of the first field generating electrode 191*c* may be about 100% of the entire length of the branch electrode 194*b*. That is, the sub-edge B12 providing the step portion may extend to be aligned to the edge side of the corresponding branch electrode 194*b*.

In an alternative exemplary embodiment, the length of the overlapping of the step portion and the branch electrode 194*b* for one branch electrode 194*b* overlapping the step portion of the first field generating electrode 191*c* may be about 10% to about 90% of the entire length of the branch electrode 194*b*.

Next, the LCD according to an exemplary embodiment of the invention will be described with reference to FIG. 12 along with FIGS. 1 to 8. The same constituent elements as of the previous exemplary embodiment are indicated by the same reference numerals, and the same description is omitted.

Figure 12:
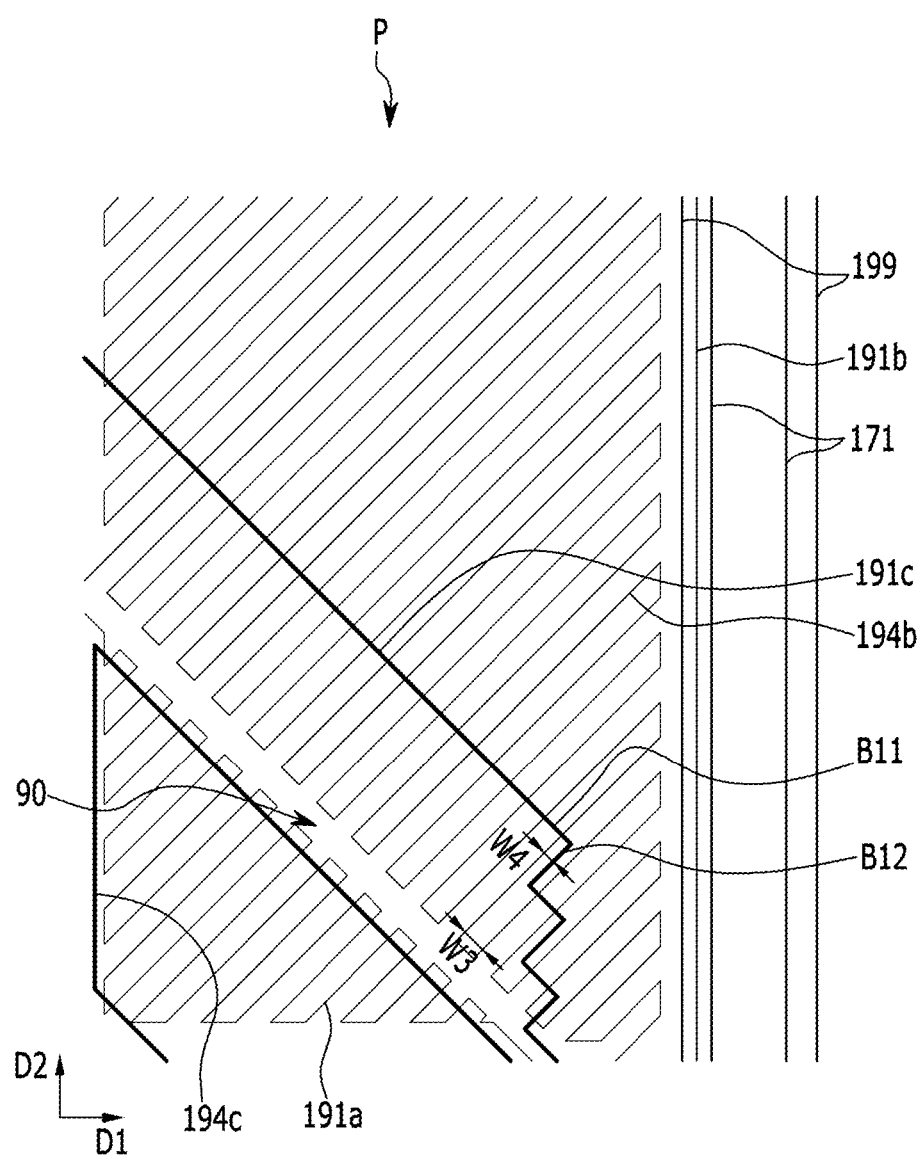
FIG. 12 is a plan view of an exemplary embodiment of a part of one pixel of an LCD according to the invention.

FIG. 12 is a plan view of a part of one pixel of an LCD according to an exemplary embodiment of the invention.

Referring to FIG. 12, the LCD according to an exemplary embodiment of the invention is the same as most of the LCD according to the exemplary embodiment shown in FIGS. 1 to 8, but the shape of the first field generating electrode 191*c* may be different.

The first field generating electrode 191*c* may include the connection 194*c* positioned about at the center of the opening region of one pixel PX. The connection 194*c* may connect two portions that are separated from each other in the first field generating electrode 191*c*, and may extend about in the second direction D2.

According to an exemplary embodiment of the invention, the first field generating electrode 191*c* may include a plurality of step portions for one domain of R1, R2, R3, and R4 at the position adjacent to the shielding electrode line 199.

The sub-edge B12 extending substantially parallel to the length direction of the branch electrode 194*b* among at least one of sub-edges among a plurality of step portions of the first field generating electrode 191*c* positioned at one domain of R1, R2, R3, and R4 may overlap the inside area of the corresponding branch electrode 194*b*. That is, the width W4 between the sub-edge B12 extending substantially parallel to the length direction of the branch electrode 194*b* among the sub-edges providing the step portion and the edge side of the corresponding branch electrode 194*b* is larger than zero and smaller than the width W3 of the branch electrode 194*b*.

In detail, the width of the overlapping region of at least one among a plurality of step portions of the first field generating electrode 191*c* positioned in one domain of R1, R2, R3, and R4 and one branch electrode 194*b* overlapping thereto may be about 10% to about 90% of the entire width of the branch electrode 194*b*. Therefore, the sub-edge B12 extending substantially parallel to the length direction of the branch electrode 194*b* among the sub-edges of the step portion may sufficiently obtain the process margin to overlap the branch electrode 194*b*.

Particularly, the sub-edge B12 extending substantially parallel to the length direction of the branch electrode 194*b* among the sub-edges providing the step portion may extend corresponding to the center portion of the corresponding branch electrode 194*b*. As described above, when the step portion of the first field generating electrode 191*c* is provided to overlap about half of the corresponding branch electrode 194*b*, the sub-edge B12 extending substantially parallel to the length direction of the branch electrode 194*b* among the sub-edges of the step portion may further sufficiently obtain the process margin to overlap the branch electrode 194*b*.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first field generating electrode;
an opposed electrode facing the first field generating electrode;
a liquid crystal layer interposed between the first field generating electrode and the opposed electrode;
a shielding electrode line separated from the first field generating electrode; and
a second field generating electrode including a plurality of branch electrodes overlapping the first field generating electrode,
wherein the first field generating electrode includes a main edge and an inner edge opposing and substantially parallel to each other as opposing major sides defining the first field generating electrode and each crossing a plurality of the branch electrodes in a plan view, a first sub-edge meeting the main edge at a first vertex, and a second sub-edge meeting the first sub-edge at a second vertex,
the first sub-edge and the second sub-edge form a step portion of the first field generating electrode adjacent to and facing the shielding electrode line, and
a first distance between the main edge and the inner edge is greater than a second distance between the second sub-edge and the inner edge.

2. The liquid crystal display of claim 1, wherein
at least one among the main edge and the second sub-edge extends in a direction crossing a length direction of a branch electrode of the plurality of branch electrodes.

3. The liquid crystal display of claim 2, wherein
at least one among the main edge and the second sub-edge defines an angle of about 70 degrees to about 110 degrees with reference to the length direction of the branch electrode.

4. The liquid crystal display of claim 3, wherein
the first sub-edge defines an angle of about 70 degrees to about 110 degrees with reference to the main edge or the second sub-edge.

5. The liquid crystal display of claim 4, wherein
the first sub-edge overlaps an inside area of the branch electrode or an edge side of the branch electrode.

6. The liquid crystal display of claim 5, wherein
a length of an overlapping region of one branch electrode overlapping the step portion is about 10 percent to about 90 percent of an entire length of the branch electrode.

7. The liquid crystal display of claim 6, wherein:
the first sub-edge extends along a center line extending in the length direction in the inside area of the branch electrode.

8. The liquid crystal display of claim 7, wherein
the first field generating electrode and the shielding electrode line are positioned in a same layer.

9. The liquid crystal display of claim 8, wherein:
the second field generating electrode further includes a first subpixel electrode and a second subpixel electrode which are applied with different voltages from each other;
the first subpixel electrode and the second subpixel electrode are separated from each other by a gap; and
the first field generating electrode overlaps the gap.

10. The liquid crystal display of claim 9, wherein
an overlapping area of the first field generating electrode and the second subpixel electrode is larger than an overlapping area of the first field generating electrode and the first subpixel electrode.

11. The liquid crystal display of claim 10, wherein
a voltage applied to the first subpixel electrode is greater than that of the second subpixel electrode.

12. The liquid crystal display of claim 11, wherein
the first field generating electrode and the second field generating electrode include a plurality of domains in which control directions of liquid crystal molecules of the liquid crystal layer are different from each other.

13. The liquid crystal display of claim 12, wherein
the first field generating electrode is electrically connected to the first subpixel electrode.

14. The liquid crystal display of claim 13, further comprising
an insulating layer positioned between the first field generating electrode and the second field generating electrode.

15. The liquid crystal display of claim 2, wherein
the first sub-edge defines an angle of about 70 degrees to about 110 degrees with reference to the main edge or the second sub-edge.

16. The liquid crystal display of claim 2, wherein
a length of an overlapping region of one branch electrode overlapping the step portion is about 10 percent to about 90 percent of an entire length of the branch electrode.

17. The liquid crystal display of claim 1, wherein
the first field generating electrode and the shielding electrode line are positioned in a same layer.

18. The liquid crystal display of claim 1, wherein:
the second field generating electrode includes a first subpixel electrode and a second subpixel electrode which are applied with different voltages from each other;
the first subpixel electrode and the second subpixel electrode are separated from each other by a gap; and
the first field generating electrode overlaps the gap.

* * * * *